United States Patent
Sim

(10) Patent No.: US 8,532,606 B2
(45) Date of Patent: Sep. 10, 2013

(54) METHOD AND SYSTEM FOR PROVIDING AN EMERGENCY LOCATION SERVICE USING INTEROPERABILITY BETWEEN IMS CORE AND ACCESS NETWORK

(75) Inventor: Dong Hi Sim, Seoul (KR)

(73) Assignee: LG Electronics Inc., Seoul (KR)

( * ) Notice: Subject to any disclaimer, the term of this patent is extended or adjusted under 35 U.S.C. 154(b) by 1125 days.

(21) Appl. No.: 12/067,273

(22) PCT Filed: Aug. 29, 2006

(86) PCT No.: PCT/KR2006/003992
§ 371 (c)(1),
(2), (4) Date: Mar. 18, 2008

(87) PCT Pub. No.: WO2007/043773
PCT Pub. Date: Apr. 19, 2007

(65) Prior Publication Data
US 2008/0261557 A1    Oct. 23, 2008

Related U.S. Application Data

(60) Provisional application No. 60/756,999, filed on Jan. 9, 2006, provisional application No. 60/741,063, filed on Dec. 1, 2005, provisional application No. 61/724,284, filed on Oct. 7, 2005.

(51) Int. Cl.
*H04M 11/04* (2006.01)

(52) U.S. Cl.
USPC .................. 455/404.1; 455/404.2; 455/456.1; 455/456.2; 455/456.3; 455/456.5; 455/456.6; 379/45; 379/49

(58) Field of Classification Search
USPC ............................................ 455/404.1, 404.2
See application file for complete search history.

(56) References Cited

U.S. PATENT DOCUMENTS

| | | | |
|---|---|---|---|
| 2004/0081139 A1 | 4/2004 | Beckmann et al. | |
| 2004/0162892 A1 | 8/2004 | Hsu | |
| 2005/0153706 A1 | 7/2005 | Niemenmaa et al. | |
| 2005/0233727 A1* | 10/2005 | Poikselka et al. | 455/404.2 |
| 2007/0060097 A1 | 3/2007 | Edge et al. | |

FOREIGN PATENT DOCUMENTS

KR    10-2004-0090023 A    10/2004

OTHER PUBLICATIONS

3GPP TR 23.867 V7.0.0 Sep. 2005 pp. 1-80.*

(Continued)

*Primary Examiner* — Rafael Pérez-Gutiérrez
*Assistant Examiner* — Joshua Schwartz
(74) *Attorney, Agent, or Firm* — Birch, Stewart, Kolasch & Birch, LLP

(57) ABSTRACT

When a user equipment accessing an access network transmits an emergency call initiating request message to an E-CSCF, the E-CSCF transmits a message requesting for retrieving a current location of the user equipment to a location retrieval unit and the location retrieval unit measures the current location of the user equipment using the access network and transmits a message including the measured location information to the E-CSCF. Then, the E-CSCF establishes a communication channel between the user equipment and an emergency center corresponding to the current location information of the user equipment using a location service response message. Accordingly, it is possible to efficiently provide an emergency location service regardless of structures of networks.

4 Claims, 5 Drawing Sheets

(56) References Cited

OTHER PUBLICATIONS

Mark L. Younge, "High Interest Subject: Location-Based Services", Global Standards Collaboration, Aug. 28-Sep. 2, 2005, Sophia Antipolis, France.

"3rd Generation Partnership Project; Technical Specification Group Services and System Aspects; Internet Protocol (IP) Based on IP Multimedia Subsystem (IMS) Emergency Sessions", Release 7T, 3GPP TR 23.867, vol. 7.0.0, Sep. 30, 2005, pp. 13-22.

"Secure User Plane Location Architecture", Draft Version 1.0, OMA-AD-SUPL-V1_0-20050622-D, Jun. 22, 2005, pp. 23-26.

3GPP TR 23.867 V7.0.0 (Sep. 2005), 3rd Generation Partnership Project: Technical Specification Group Services and System Aspects; Internet Protocol (IP) based IP Multimedia Subsystem (IMS) emergency sessions (Release 7), Sep. 30, 2005, pp. 7-20, and pp. 78-79).

3GPP Technical Specification, "IP Multimedia Subsystem (IMS) emergency sessions (Release 7)," Oct. 2005.

* cited by examiner

METHOD AND SYSTEM FOR PROVIDING AN EMERGENCY LOCATION SERVICE USING INTEROPERABILITY BETWEEN IMS CORE AND ACCESS NETWORK

TECHNICAL FIELD

The present invention relates to a method and a system for providing an emergency location service, and more particularly, to a method and a system for providing an emergency location service using interoperability between an IP multimedia subsystem (IMS) core and an access network.

BACKGROUND ART

An IP multimedia subsystem (IMS) has attracted attentions as a core communication system for providing a new service in an IP (Internet Protocol) based nextgeneration communication environment. The IMS provides a variety of multimedia services in an environment of mobile communication networks and selves to unify IP networks and mobile communication environments as a set of nodes for performing a call control. Accordingly, the IMS makes it possible to provide an IP-based multimedia service using user equipments by facilitating interoperations between the user equipments and the IP networks. The IMS includes three layers of a connectivity layer for connection to the IMS, a control layer for managing a call and session routing, a charging process, and a file protocol, and an application layer for storing and managing data and generating a service for a subscriber.

The IMS can support a variety of contents types such as voices, multimedia data, and texts in interoperation with the PSTN as the existing telephone network and the Internet. Since the IMS employs a session initiation protocol (SIP) as a signaling protocol usable for the IP-based multimedia service such as an Internet telephony service, a remote video conference service, a voice mail service, and a location service, the IMS can support the existing VoIP and a real-time streaming service. The SIP is a call control protocol of the application layer for retrieving a location of an opposite user equipment and generating, correcting, and ending an IP-based multimedia service session between user equipments or between a user equipment and an entity having an IP address.

On the other hand, the mobile communication systems has a relevant function unit for calculating a location of a terminal and provides a location service of calculating location information of a target terminal and forwarding location information including the calculated location information to an entity in the network. Examples of the method of calculating the current location of the target terminal can include a cell-ID method using an ID of a cell to which the terminal belongs, a method of measuring a period of time when a radio wave travels to a base station from the terminal and then calculating a location of the terminal using a trigonometrical survey, and a method using a global positioning system (GPS).

The location service using the mobile communication system serves as a basis for providing users with an emergency location service as well as a variety of accessory services such as a traffic information service, a location information service, a weather information service, and a car navigation service. Particularly, since the emergency location service (for example, a service for emergently establishing an emergency call between a user equipment and an emergency center when a user is subjected to a disaster or a traffic accident) require rapid check of a location of the user to establish an emergency call with an accurate emergency center, the emergency location service needs to provide current location information or updated location information of a user equipment to provide an emergent rescue to the user, as well as to establish an emergency call between the user equipment and an emergency center most suitable for the current location of the user equipment by the use of a system including sets of mobile communication networks or control nodes.

However, the structure of a network involved in the emergency location service varies depending on network structures to be supported and call processing procedures and transmission parameters between entities in the network for providing the emergency location service are different from each other. Therefore, a method for providing an emergency location service using interoperability between them is required.

DISCLOSURE OF INVENTION

Technical Problem

A technical goal of the invention is to provide a method and a system for providing an emergency location service using interoperability between an IMS core and an access network.

Technical Solution

According to an aspect of the invention, there is provided a method for providing an emergency location service, comprising: transmitting an emergency call initiating request message from a user equipment attached to an access network to E-CSCF via a P-CSCF; transmitting a location service request message requesting for retrieving a location of the user equipment from the E-CSCF to a location retrieval unit in response to the emergency call initiating request message; calculating, by the location retrieval unit which accesses the user equipment, current location information of the user equipment; transmitting a location service response message including the current location information of the user equipment from the location retrieval unit to the E-CSCF; and transmitting the emergency call initiating request message from the E-CSCF to an emergency center which is selected by the E-CSCF on the basis of the transmitted current location information of the user equipment.

According to another aspect of the invention, there is provided a method for providing an emergency location service, comprising: transmitting an emergency call initiating request message from a user equipment to an E-CSCF via a P-CSCF; transmitting a location service request message requesting for retrieving a location of the user equipment from the E-CSCF to a location retrieval unit in response to the emergency call initiating request message; acquiring, by the location retrieval unit which accesses the user equipment and calculates current location information of the user equipment, emergency center identification information using the current location information of the user equipment; transmitting the emergency center identification information from the location retrieval unit to the E-CSCF; and transmitting the emergency call initiating request message from the L-CSCF to an emergency center corresponding to the emergency center identification information.

According to another aspect of the invention, there is provided a method for providing an emergency location service using a user equipment, the method comprising: transmitting a session connection request message including an emergency call initiating request message to an IMS core; accessing a location retrieval unit for calculating current location information of the user equipment to exchange information necessary for the retrieval of location with the location retrieval unit, in response to a request for retrieving a location of the user equipment from the IMS core; and establishing an emergency call with an emergency center in response to the session connection request message from the emergency center which is selected on the basis of the current location information of the user equipment acquired by the location retrieval unit.

Advantageous Effects

According to the present invention, an emergency call between a user equipment and an emergency center is established using interoperability between the IMS core and the location retrieval unit having a location retrieval function. Accordingly, it is possible to efficiently process the emergency call between the user equipment and the emergency center using the interoperability between the IMS core and the access network.

Since the E-CSCF or the E-AS of the IMS core serves as an intermediate medium for properly routing an IMS signal and an LCS signal (signals relevant to the location service), two kinds of signals can be smoothly distinguished or correlated. Accordingly, it is possible to provide an emergency location service using the IMS regardless of characteristics or structures of the networks.

DESCRIPTION OF REFERENCE NUMERALS AND SIGNS

Figure 1:
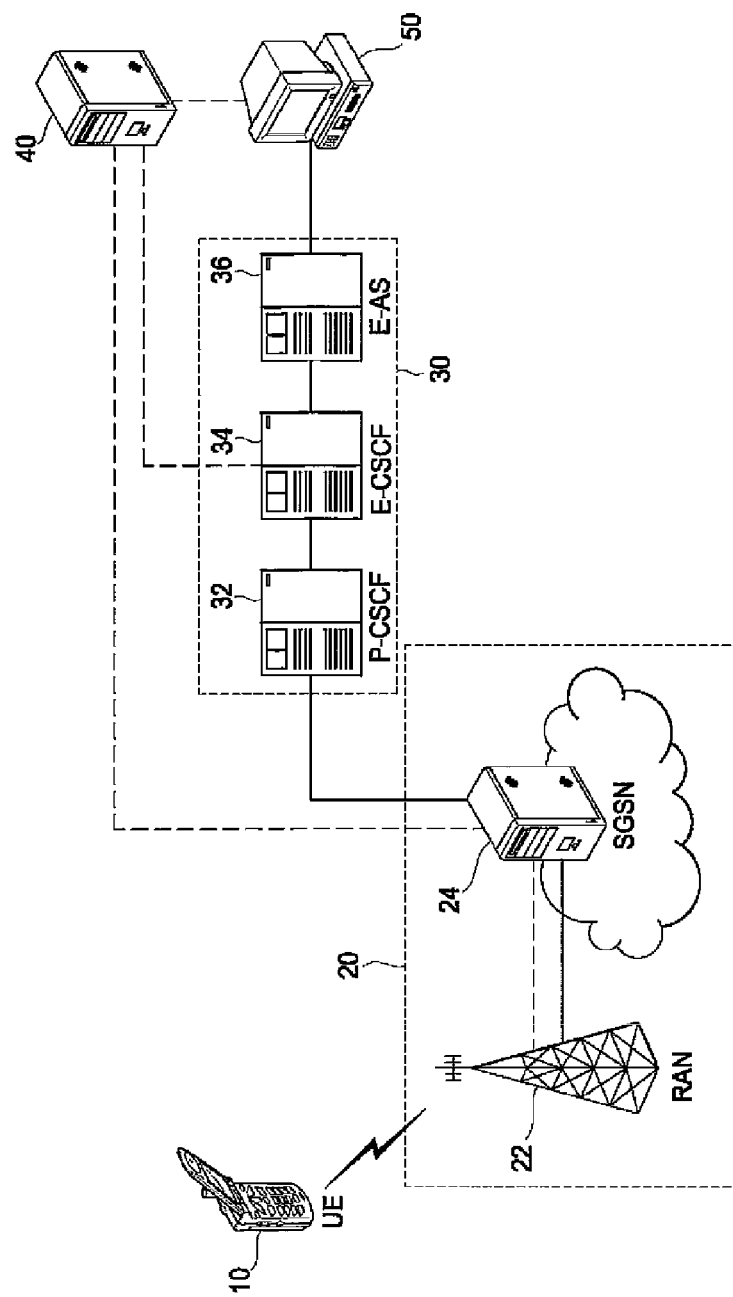
FIG. 1 is a block diagram illustrating a system for providing an emergency location service according to an embodiment of the present invention.

20: ACCESS NETWORK
30: MS CORE
40: LOCATION RETRIEVAL UNIT
50: EMERGENCY CENTER

Hereinafter, exemplary embodiments of the present invention will be described in detail with reference to the attached drawings. In the following description, like elements are denoted by like reference numerals.

BEST MODE FOR CARRYING OUT THE INVENTION

FIG. 1 is a block diagram illustrating a system for providing an emergency location service according to an embodiment of the present invention.

As shown in FIG. 1, a system for providing an emergency location service includes a user equipment (UE) 10, an access network 20, an IP multimedia subsystem (IMS) core 30, a location retrieval unit 40 having a location retrieval function, and an emergency center 50.

The UE 10 is an entity which can communicate with the IMS core 30. UE 10 has a specific ID and an IP address (IP Addr). The ID may be a public user ID in the type of SIP URI (Uniform Resource Identifier) or TEL URI. The UE 10 may have an emergency service ID (for example, emergency service SIP URI or TEL URI) when there is an emergency call-specific ID promised for an emergency call.

The UE 10 can communicate with the location retrieval unit 40. The UE 10 may be a user equipment in a universal mobile telecommunication system (UMTS), a mobile station (MS) in a global system for mobile communication) or IS-95 (Inter Standard-95), or a mobile communication terminal such as a laptop computer and a personal digital assistance (PDA) having an UE function.

The access network 20 is a set of network entities and interfaces providing IP transport connectivity between the UE 10 and the IMS entities. That is, the access network 20 routes an SIP signal so as to enable the UE 10 to communicate with the IMS core 30. Examples of the access network can include a packet switched network (PS network) and a circuit switched network (CS network). In the following description, the PS network is used as the access network 20 of the invention, but the invention is not limited to the PS network. The PS network can includes a radio access network (RAN) 22 having a base station and a radio network controller (RNC) and a serving GPRS supporting node (SGSN) for processing packet data.

The IMS core 30 includes a proxy call session control function (P-CSCF) 32 which the UE 10 first passes through for access to the IMS core 30 and an emergency call session control function (E-CSCF) 34 exclusively processing an emergency session.

An emergency application server (E-AS) 36 serves to provide routing information on the emergency center 50 and to redirect the SIP signal so as to transmit an emergency call to a proper emergency center 50 through the IMS core 30. The E-AS 36 may be included in the IMS core 30 or may be provided independent of the IMS core. In this embodiment, the IMS core includes the E-AS 36. The E-AS 36 may be unified into the E-CSCF 34.

The IMS core 30 may further include an S-CSCF and an I-CSCF substantially processing a variety of sessions in a network and a home subscriber server (HSS).

The location retrieval unit 40 is a system for processing current location information, initial location information, and updated location information of the user equipment and may interoperate with a unit for acquiring the routing information or may include such a unit. The location retrieval unit 40 may be an entity of a mobile communication network such as a GSM public land mobile network (GSM PLMN) and may request a home location register (HLR) for the routing information or may perform authentication. The location retrieval unit 40 may interoperate with an additional gateway mobile location center (GMLC) or may include the GMLC, or may be the GMLC itself.

The emergency center 50 receives the location information of the UE 10 from the IMS core 30, more specifically, the E-CSCF 34 and performs a function of processing an emergency situation of the user. The emergency center 50 may be a physical location for receiving an emergency call from the user, such as a public safety answering point (PSAP). That is, the emergency center 50 may be a server of a police station, a fire station, an emergency center of a hospital, or the like. The emergency center 50 may be independent of the networks.

For example, one emergency center 50 may cover a plurality of network areas or a plurality of emergency centers 50 may exist in one network.

The emergency center 50 may be connected to an IMS network, a public switched telephone network (PSTN), a CS domain, a PS domain, or any other packet network. In addition, for example, when it is necessary to update the location of the UE 10, the emergency center 50 may request the location retrieval unit 40 to retrieve an updated location of the UE 10.

Two kinds of signals may be used to provide the emergency location service using the interoperation between the EMS core and the PS network mentioned above. One is an LCS signal which is transmitted (indicated by a dotted line) between the UE 10 the PS network 20—the location retrieval unit 40, between the location retrieval unit 40 and the IMS core 30, and between the location retrieval unit 40 and the emergency center 50 and which is used for a location service request. The other is an IMS signal which is transmitted (indicated by a solid line) among the PS network 20—the IMS core 30 the location retrieval unit 40 the emergency center 50 and which is used for an emergency call start request. The IMS signal may be transmitted between the IMS core 300 and the location retrieval unit 400. The IMS signal may employ the SIP and the LCS signal may employ a roaming location protocol (RLP), a mobile location protocol (MLP), or the SIP. However, this is not restricted, but a variety of protocols may be used depending on the environments, in addition to the SIP, the RLP, and the MLP.

The system for providing an emergency location service using interoperation between the IMS core and the PS network with two kinds of signals operates as follows.

First, when the UE 10 connected to the PS network 20 transmits an emergency call initiating request message to the P-CSCF 32 using the IMS signal, the P-CSCF 32 forwards the received message to the E-CSCF 34. The emergency call initiating request message can include location information indicating a location of the user equipment and information for identifying the user equipment.

The E-CSCF 34 having received the emergency call initiating request message transmits a message requesting for retrieval of the location of the UE 10 to the location retrieval unit 40 in the corresponding network, which is known in advance or obtained on the basis of the location information received by using the LCS signal. The message can include information for identifying the user equipment and the PS network.

Next, the location retrieval unit having received the location service request message from the E-CSCF 32 accesses the UE 10 through the SGSN 24 and the RAN 22 of the PS network 20 and calculates the current location of the user equipment using a predetermined location retrieval method. However, when the location information of the user equipment included in the emergency call initiating request message is sufficient to determine an emergency center, this step can be omitted. The location retrieval unit 40 acquiring the current location of the user equipment transmits a location service response message including the current location information of the user equipment to the E-CSCF 34 by using the LCS signal in response to the location service request message.

The E-CSCF 34 transmits an emergency call initiating request message IMS signal) for the UE 10 to the emergency center 50 corresponding to the location information of the UE 10 by the use of the location service response message including the current location information of the UE 10 transmitted from the location retrieval unit 40. The emergency center having received the IMS signal sets a channel to the UE 10 by using a predetermined method. The emergency location service using interoperation between the IMS core and the PS network is provided in this way.

When it is necessary to update the location information of the UE 10 after the channel is set between the UE 10 and the emergency center 50, a location updating procedure can be performed. In this case, the emergency center 50 transmits a location service request message to the location retrieval unit 40 by using the LCS signal so as to update the location information of the UE 10. The location retrieval unit 40 having received the location service request message accesses the user equipment through the SGSN 24 and the RAN 22 of the PS network 20, calculates the current location of the user equipment using a predetermined location retrieval method, and then transmits the calculated value to the emergency center 50 again.

As described above, since the E-CSCF 34 serves as an intermediate medium processing the IMS signal and the LCS signal, the emergency location service using interoperation between the IMS core 30 and the PS network 20 can be provided.

According to this embodiment, even when the IMS signal or the LCS signal is updated and thus nodes associated with the IMS signal or the LCS signal need be replaced or upgraded, it is necessary to replace or upgrade only the node processing the MS signal or the node processing the LCS signal. Since the IMS signal and the LCS signal for establishing an IMS emergency call intersect each other in the E-CSCF, two kinds of signal paths can be clearly distinguished from each other or correlated to each other.

Now, a method for providing an emergency location service using interoperation between the IMS core 30 and the access network 20 will be described on the basis of the system for providing an emergency location service.

Figure 2:
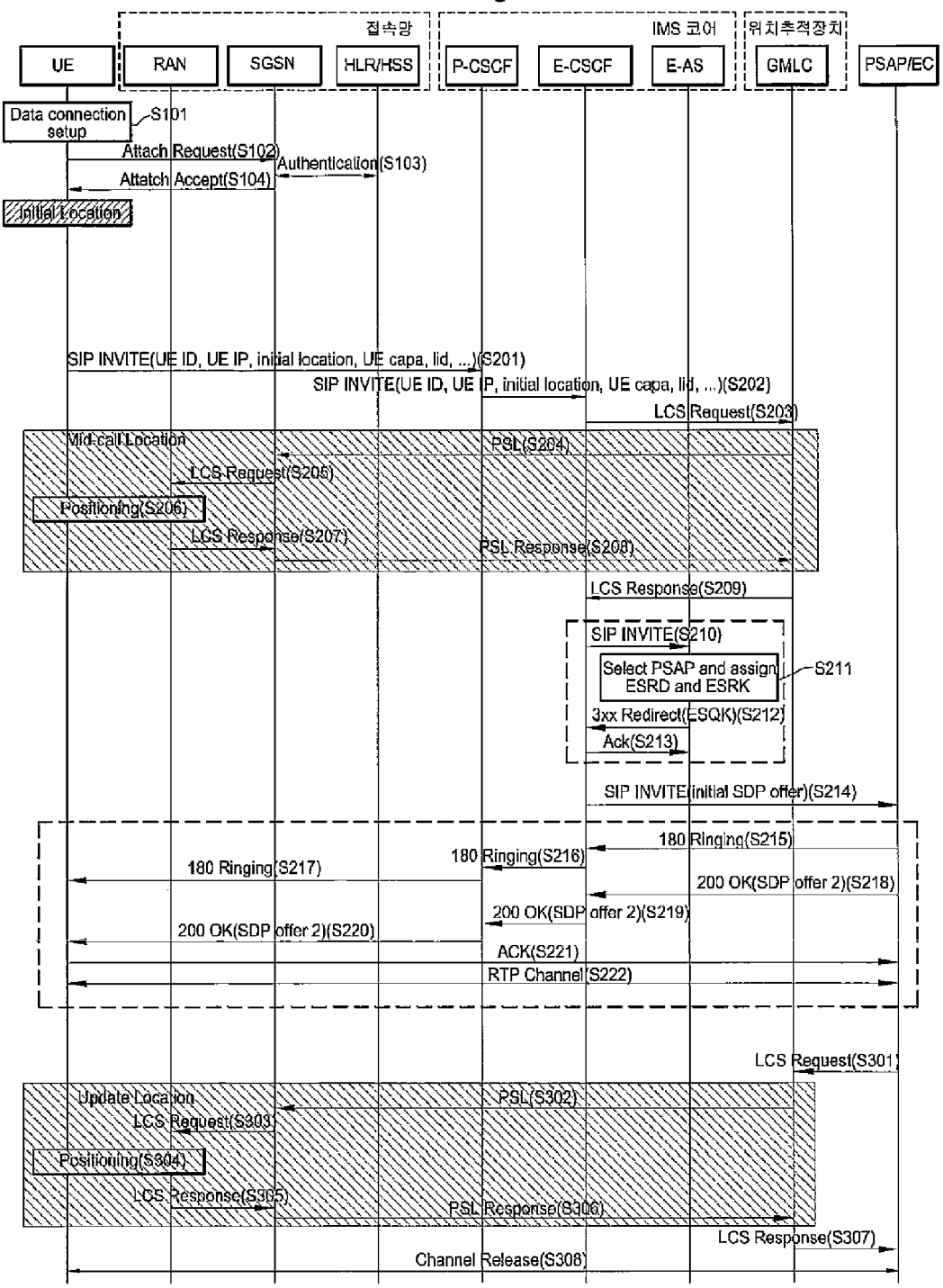
FIG. 2 is a flowchart illustrating a method for providing an emergency location service according to an embodiment of the invention.

FIG. 2 is a flowchart illustrating a method for providing an emergency location service according to an embodiment of the invention. The E-CSCF 34 is used as the intermediate medium properly routing the IMS signal and the LCS signal and the E-AS 36 may be included in the E-CSCF 34 or may exist independently. Here, the location retrieval unit 40 include only the GMLC, but may include other entities other than the GMLC.

Referring to FIG. 2, when the emergency location service is performed through the IMS core, the location information of the user equipment transmitted to the emergency center (PSAP/EC) can be classified into three kinds depending on the situations.

First information is initial location information which includes the initial location information of the user equipment acquired through interoperation of the user equipment with the PS network. The initial location information can be a cell ID of the IP-CAN or an access point ID other than a geometrical location of the user equipment. The initial location information may be acquired by another communication network or another system or entity performing the location retrieval function. This is a case where it is not possible to calculate the initial location value of the SET through the interoperation with the IP-CAN or where an obstacle occurs in calculating the initial location value.

Second information is mid-call location information. The mid-call location information is transmitted when the initial location information is not sufficient to select a suitable emergency center, when more accurate location information is requested, or when it is necessary to confirm the location information. In this case, the E-CSCF requests the location retrieval unit for the location retrieval of the user equipment, the request is forwarded to the SGSN, the location information is calculated through the interoperation between the user equipment and the RAN, and the calculated location information is forwarded to the E-CSCF with the location information added to a message such as SIP INVITE.

Third information is updated location information which is transmitted when the emergency center requests the location retrieval unit for the updated location information of the user equipment after the emergency call is established between the user equipment and the emergency center. In this case, the location retrieval unit calculates a location retrieval value using the interoperation with the user equipment through the SGSN and the RAN in response to the updated location information request from the emergency center and then forwards the calculated location information to the emergency center.

Hereinafter, the method for providing an emergency location service using interoperation between the IMS core and the access network will be described in detail with reference to FIG. 2.

The method for providing an emergency location service roughly includes three procedures. A first procedure is a procedure of attaching the user equipment to the PS network, a second procedure is an emergency call establishing procedure of performing a location retrieval procedure for the user equipment in response to a request from the IMS core to establish an emergency call between the user equipment and the emergency center, and a third procedure is a location update procedure of updating the location information of the user equipment in response to the request from the emergency center.

Accordingly, the first procedure may be omitted when the user equipment is already attached to the PS network and the third procedure may not be performed when the location update request is not transmitted from the emergency center. The second procedure may be omitted when the initial location information is sufficient to select a suitable emergency center.

First, steps (S101 to S104) of attaching the user equipment to the PS network will be described.

Referring to FIG. 2, the user equipment establishes the RAN and the RRC connection for forwarding an attachment request message to the SGSN and sets a radio bearer (S101). The PS network is an access network having IP connectivity and may be a GPRS, 3GPP, or 3GPP2 network.

When the data connection is set to the PS network, the user equipment transmits the attachment request message to the SGSN (S102). The attachment request message includes a user equipment ID (msid) such as MSISDN and emergency indicator information.

The emergency indicator information is information indicating that the relevant session is a message associated with an emergency call and can be inserted into the message by adding a field of predetermined bits or specifying an extra field. The emergency indicator information may be inserted in various types indicating an emergency call, such as emergency_event. A predetermined value may be inserted into the field in case of emergency call request and the field is left empty in case of commercial service request, whereby it can be distinguished whether the relevant SIP message is a message associated with an emergency call. In this case, higher priority can be given to the message including the emergency indicator information than to other commercial messages.

The SGSN having received the attachment request message performs an authentication procedure to the HSS/HLR (S103). In this procedure, the SGSN may acquire an authentication vector for authenticating the user equipment from the HSS/HLR.

The SGSN transmits an attachment acknowledgement message to the user equipment in response to the attachment request message (S104).

At this time, the user equipment having received the attachment acknowledgement message performs a predetermined P-CSCF discovery procedure such as a DNS query and acquires a P-CSCF address in the current network. The acquired P-CSCF address is used to transmit an SIP REGISTER message in the subsequent procedure. The user equipment can acquire the current location information of the user equipment from information acquired through the attachment procedure.

In this way, when the acknowledgement message is forwarded to the user equipment from the SGSN, the procedure of attaching the user equipment to the PS network is ended. When the registration is completed, the user equipment starts the second procedure of establishing an emergency call. When the user equipment is already attached to the PS network, the first procedure can be omitted.

Next, the emergency call establishing procedure (S201 to S222) for retrieving the location of the user equipment in response to a request from the IMS core and establishing an emergency call between the user equipment and the emergency center will be described.

The emergency call establishing procedure is started when the user equipment transmits an emergency call initiating request message (SIP INVITE) to the IMS core (S201 and S202). This start step can be divided into step S201 of transmitting the emergency call initiating request message (SIP INVITE) from the user equipment to the P-CSCF and step S202 of forwarding the SIP INVITE message from the P-CSCF to the E-CSCF.

The emergency call initiating request message (SIP INVITE) includes the ID of the user equipment (UE ID). The emergency call initiating request message can further include an IP address of the UE, initial location information, capability of the user equipment (UE Capa), a location identifier (lid) of the network to which the user equipment currently is attached, emergency indicator information, and initial session description protocol offer (initial SDP offer).

As described above, the ID of the user equipment may be a public user ID such as SIP URI or TEL URI. An MSID (Mobile Station Identifier) which is an ID additionally given from an MSISDN (Mobile Station Integrated System Digital Network) may be transmitted together with the ID of the user equipment. When there is an emergency service ID (SIP URI or TEL URI) promised specifically for an emergency call, the emergency service ID may be transmitted.

The IP address of the user equipment means information for allowing another entity in the mobile communication network to access the UE.

The initial location information is an initial location value acquired using the interoperation between the user equipment and the access network and may be a network identifier such as the cell ID of a cell to which the UE currently belongs, other than the physical location value.

The UE Capa may be emergency capability information of the user equipment associated with an emergency call and may include a location measuring method supported by the user equipment and protocol information which can be used for measuring a location. At this time, the location measuring method may be a terminal assist A-GPS method or a terminal based A-GPS method (cell ID method). Examples of the protocol used for the measurement of a location can include an RRLP (Radio Resource Location service Protocol) of the GPRS, an RRC (Radio Resource Control) protocol of WCDMA (Wideband Code Division Multiple Access), and TA-801 of CDMA.

The lid in the network to which the user equipment currently is attached is an identifier indicating a location of the user equipment in the network and may be identification information (serving cell ID) of the cell to which the user equipment currently belongs and/or identification information (such as ID of the PS network or the IP-CAN) of the access network.

The emergency indicator information is information indicating that the relevant session is a message associated with an emergency call and can be inserted into the message by adding a field of predetermined bits or specifying an extra field. The emergency indicator information may be inserted in various types indicating an emergency call, such as emergency_event. A predetermined value may be inserted into the field in case of emergency call request and the field is left empty in case of commercial service request, whereby it can be distinguished whether the relevant SIP message is a message associated with an emergency call. In this case, higher priority can be given to the message including the emergency indicator information than to other commercial messages.

The initial SDP offer indicates media information provided by the user equipment for one or more multimedia sessions. The media information of the user equipment is required for establishment of an emergency call when a multimedia session is finally opened between the user equipment and the emergency center.

It is preferable that all the information transmitted from the user equipment is included in the SIP INVITE message transmitted to the E-CSCF from the P-CSCF.

Next, the E-CSCF having received the emergency call initiating request message determines a location retrieval unit on the basis of the initial location information (for example, the serving cell ID of the user equipment or the IP address of the user equipment) received from the user equipment and transmits a location service request (LCS request) message requesting for the location measurement of the user equipment to the location retrieval unit (S203). When a location retrieval unit is known in advance, the LCS request message requesting for the location measurement of the user equipment can be transmitted to the location retrieval unit.

The location retrieval unit having received the LCS request message accesses the user equipment through the SGSN and the RAN and calculates the current location of the user equipment using a predetermined location retrieval method (S204 to S208). This procedure is specifically described now.

The location retrieval unit transmits a PSL (Provide Subscriber Location) message requesting for reporting the location value of the user equipment to the SGSN (S204). The SGSN having received the PSL message forwards the message to the RAN by using the LCS request message (S205). The RAN having received the PSL request message and the user equipment calculate the current location of the user equipment by using the RRLP/RRC message (S206). The SGSN forwards information including the calculated current location of the user equipment to the RAN by using the LCS response message (S207) and the RAN transmits the information including the current location of the user equipment to the location retrieval unit by using a PSL response message (S208).

Next, the location retrieval unit having acquired the current location of the user equipment transmits an LCS response message including the current location of the user equipment to the E-CSCF in response to the location service request message (S209).

When the initial location information of the user equipment included in the SIP INVITE message transmitted to the E-CSCF from the user equipment in step S203 is sufficient to select an emergency center, steps S204 to S208 of calculating the location between the GMLC and the user equipment can be omitted.

Subsequently, when the E-CSCF receives the LCS response message including the current location information of the user equipment from the GMLC, steps S210 to S222 of establishing a channel between the user equipment and the emergency center corresponding to the received location information of the user equipment are performed. These steps include steps S210 to S213 of selecting an emergency center on the basis of the received location information of the user equipment, step S214 of transmitting the emergency call initiating request message (SIP INVITE) to the selected emergency center, and steps S215 to S222 of opening a channel between the emergency center and the user equipment by using a predetermined method. The steps will be described in detail below.

First, the E-CSCF having received the LCS response message including the current location information of the UE from the location retrieval unit transmits the SIP INVITE message including the location information of the UL to the E-AS (S210). The SIP INVITE message transmitted to the E-AS may include all the information initially included in the SIP INVITE message along with the location information of the UE.

The E-AS having received the SIP INVITE message including the location information of the UE selects an emergency center on the basis of the location information of the UE (S211). In this case, the E-AS may extract an emergency center identifier from the received message, for example, the emergency service ID. In some cases, the E-AS may extract information for identifying the emergency center other than the emergency center identifier.

The E-AS transmits a transmission message including information on the selected emergency center to the E-CSCF (S212). The transmission message may be an SIP 3xx Redirection message, but is not limited to it. The transmission message may include the information for identifying an emergency center. The information for identifying an emergency center may be ESRD (Emergency Service Routing Digits), ESRK (Emergency Service Routing Key), ESRN (Emergency Service Routing Number), and/or ESQK (Emergency Service Query Key).

Here, the ESRD and the ESRK are a kind of special number associated with an emergency call used only in North America. The ESRD is a number for identifying a base station or a sector closest to the current user equipment and the ESRK is a number for identifying an emergency call provider for providing the current emergency call by combining various base stations or sectors. The ESRN and the ESQK are information used by emergency centers for an emergency call in the existing CS networks. The ESRN and the ESQK are values used in North America for routing an emergency call to an emergency center supporting the existing PSTN network in networks supporting an IP. The ESRN and the ESRK are values obtained by replacing the existing values of the ESRD and the ESRK for interoperation between the IP network and the PSTN network.

The ESRN and the ESQK are special numbers associated with an emergency call used only in North America. The ESRN is a number used to route an emergency call to a proper gateway so as to forward the emergency call initiating request message to an emergency center based on the circuit switched network. The ESQK is information used to identify a specific emergency call, is used as a key for acquiring location information associated with the specific emergency call and callback information by the location retrieval unit, and is used when the emergency center inquires location information to the location retrieval unit.

On the other hand, the E-AS may forward the ESRD, the ESRK, the ESRN, and the ESQK to the E-CSCF by using the SIP INVITE message. In this case, since the E-AS is used like an SIP proxy server, the subsequent step S213 of forwarding an acknowledgement message to the E-AS from the E-CSCF is not necessary.

Subsequently, the E-CSCF having received the message including the information on the emergency center transmits the acknowledgement message to the E-AS (S213).

The E-CSCF acquires the routing information on the emergency center through the above-mentioned steps of S210 to S213. Here, the E-CSCF acquires the routing information on the emergency center through the interoperation with the E-AS, but when the E-AS is a part of the E-CSCF, the E-CSCF can directly select or extract the information on the emergency center.

The E-CSCF transmits the SIP INVITE message to the emergency center (for example, PSAP) selected on the basis of the received information for identifying an emergency center (S214). The SIP INVITE message can include an IP address of the UE (UE IP), initial location information, capability of the user equipment (UE Capa), a location identifier (lid) of the network to which the UE currently is attached, emergency indicator information, and initial session description protocol offer (initial SDP offer).

The emergency center having received the SIP INVITE message from the E-CSCF accesses the UE on the basis of the received message to open a channel for transmitting a message in accordance with a normal call request procedure (S215 to S222). The channel may be a real-time transport protocol channel (RTP channel). The procedure of opening the channel is not particularly limited and may be different depending on the access networks. For example, as described later, the procedure may be performed by using the IMS core as the intermediate medium and exchanging pre-determined messages between the emergency center and the UE.

Now, steps (S215 to S222) of opening a transmission channel are described specifically. However, since the steps are only an example, they can be modified in various forms depending on connection methods.

The emergency center having received the SIP INVITE message transmits a call message to the IMS core, for example, the E-CSCF, so as to open the transmission channel with the UE and the VMS core forwards the call message to the UE (S216 and S217). The call message may be an SIP 180 ringing message. In some cases, the call message may be forwarded to the UE through the E-AS. In this case, the E-AS is used like the SIP proxy server as described above. In this way, when the E-AS is used like the SIP proxy server, the procedure of forwarding the 180 ringing message between the E-CSCF and the E-AS and responding to the message is further performed before forwarding the 180 ringing message to the P-CSCF from the E-CSCF.

The emergency center transmits an acknowledgement message in response to the SIP INVITE message to the IMS core, for example, the E-CSCF after transmitting the call message (S218). The acknowledgement message may be an SIP 200 OK message, but is not limited to it. In some cases, the emergency center transmits an SDP offer message, for example, an SDP offer 2 message, which indicates multimedia sessions supported by the emergency center, along with the acknowledgement message.

The E-CSCF forwards the acknowledgement message to the P-CSCF (S219) and the P-CSCF transmits the message to the UE (S220). In this case, similarly to transmitting the call message, the procedure of forwarding the acknowledgement message between the E-CSCF and the E-AS and responding to the message may be further performed before forwarding the acknowledgement message to the P-CSCF from the E-CSCF.

The UE having received the call message and the acknowledgement message transmits an acknowledgement message to the emergency center (S221). The acknowledgement message may an SIP ACK message, but is not limited to it.

In this way, when the call message and the acknowledgement message are exchanged between the UE and the emergency center, a channel is opened between the UE and the emergency center and an emergency call is performed through the channel between the UE and the emergency center (S222). The emergency call can be performed using a multimedia session included in both the initial SDP offer message and the SDP offer 2 message, that is, a multimedia session which can be supported by the UE and the emergency center.

In the method for providing an emergency location service according to the invention, the emergency call between the UE and the emergency center is performed through the interoperation between the IMS core and the location retrieval unit having a location retrieval function. At this time, the E-CSCF of the IMS core serves as the intermediate medium for properly routing the IMS signal and the LCS signal. Accordingly, it is possible to efficiently provide an emergency location service regardless of the structure of the network.

Next, a location updating procedure (S301 to S307) of updating the location information of the UE in response to a request from the emergency center will be described. The location updating procedure is assuming the establishment of an emergency call through the channel.

When the emergency call is established through the channel, the emergency center transmits a location service request message (LCS request message) to the location retrieval unit when it is necessary to update the location information of the UP or periodically (S301). The emergency center can select a location retrieval unit on the basis of the information received in step S214.

The location retrieval unit having received the LCS request message accesses the UE through the RAN to calculate the current location of the UE through the SGSN and the RAN (S302 to S306). The steps are performed through the access network between the location retrieval unit and the UE. For example, the value calculated using the RRLP/RRC message between the RAN and the UE is transmitted to the GMLC through the SGSN. The specific steps are similar to the aforementioned steps S204 to S208, description thereof is omitted.

The location retrieval unit having acquired the updated current location of the UE transmits a location service response (LCS response) message including the updated location information of the UE to the E-CSCF in response to the LCS request message (S307).

When it is intended to end the emergency call, the UE or the emergency center transmits a release message, for example, an SIP BYE message, to the opposite party (S401). When the release message may be a message using an SIP, the emergency center or the UE having received the release message transmits an acknowledgement message using the SIP, for example, an SIP 200 OK message, to the opposite party through the node through which the SIP INVITE message is forwarded. In this way, when the emergency call release message and the acknowledgement message are exchanged, the emergency call established between the UE and the emergency center is released.

MODE FOR THE INVENTION

Figure 3:
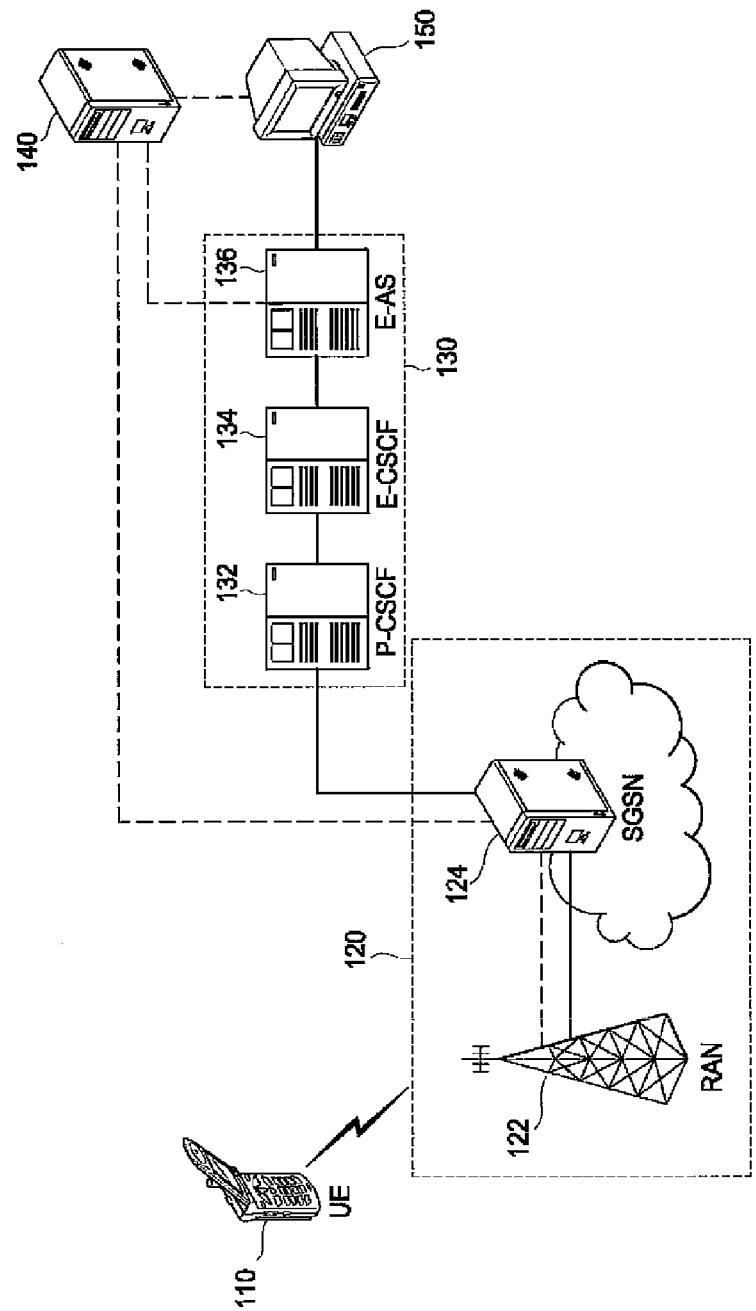
FIG. 3 is a block diagram illustrating a system for providing an emergency location service according to another embodiment of the invention.

FIG. 3 is a block diagram illustrating a system for providing an emergency location service according to another embodiment of the invention. The system for providing an emergency location service includes an UE 110, an access network 120 including an RAN and an SGSN, an IMS core having a P-CSCF 132, an E-CSCF 134, and an E-AS 136, a location retrieval unit 140 having a location retrieval function, an emergency center 150, and an E-AS 10.

The E-AS 136 provides routing information on the emergency center 150 so as to forward an emergency call to a suitable emergency center 150 through the IMS core 130. Here, the E-AS 136 is embodied as a part of the IMS core 130, but is not limited to it. For example, the E-AS 136 may be embodied as a part of the location retrieval unit 140. Hereinafter, it is assumed that the E-AS 136 is a part of the IMS core 130.

A difference from the system shown in FIG. 1 is that the E-AS 136 serves as an intermediate medium processing the IMS signal and the LCS signal. Accordingly, the E-AS 136 through which the IMS signal and the LCS signal pass is a middle point distinguishing the IMS signal and the LCS signal. The IMS signal is transmitted among the UE 110, the access network 120, and the location retrieval unit 140, between the location retrieval unit 140 and the E-AS 136 of the IMS core 130, and between the location retrieval unit 140 and the emergency center 150. Hereinafter, a PS network is used as an example of the access network.

The system for providing an emergency location service using the interoperation between the IMS core and the PS network with two kinds of signals operates as follows.

First, when the UE 110 attached to the PS network 120 transmits an emergency call initiating request message to the P-CSCF 132 with the IMS signal, the P-CSCF 132 forwards the message to the E-CSCF 134 and the E-CSCF 134 forwards the message to the E-AS 136.

The E-AS 136 having received the IMS signal transmits a message requesting for retrieving the location of the UE 110 to the location retrieval unit 140 of the corresponding network selected by the message or known in advance. The location retrieval unit 140 having received the location retrieval request message (LCS signal) accesses the UE 110 through the SGSN 124 and the RAN 122 of the PS network 120 to calculate the current location of the UE and transmits an LCS response message including the current location information of the NE to the E-AS 136 in response to the LCS request message.

The E-AS 136 establishes a channel between the UE 110 and an emergency center 150 corresponding to the location information of the UE 110 on the basis of the LCS response message including the current location information of the UP 110 transmitted from the location retrieval unit 140. In this way, the method for providing an emergency location service using the interoperation between the IMS core 130 and the PS network 120 is implemented.

On the other hand, when it is necessary to update the location information of the UE 110 after the channel is established between the UE 110 and the emergency center 150, the same procedure as the location updating procedure using the configuration shown in FIG. 1 can be performed.

As described above, by means that the E-AS 136 serves as the intermediate medium processing the IMS signal and the LCS signal, the method for providing an emergency location set vice using the interoperation between the IMS core 130 and the PS network 120 can be performed.

Figure 4:
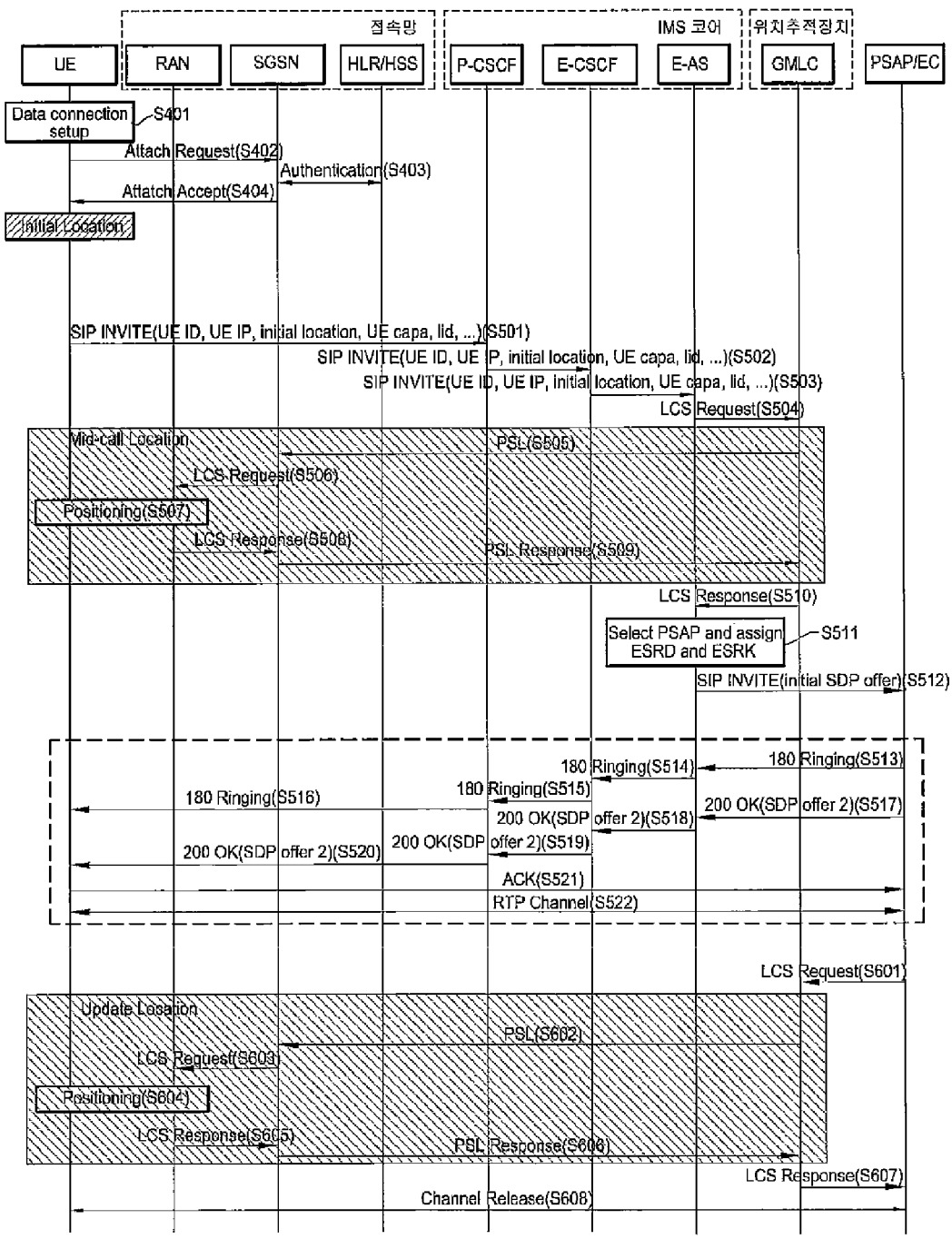
FIG. 4 is a flowchart illustrating a method for providing an emergency location service according to another embodiment of the invention.

FIG. 4 is a flowchart illustrating a method for providing an emergency location service according to another embodiment of the invention. Here, the E-AS is used as the intermediate medium for properly routing the IMS signal and the LCS signal. The E-AS serves to provide the routing information of the emergency center 150 so as to transmit an emergency call from the IMS core to a suitable emergency center. The E-AS is embodied as a part of the IMS core 130 herein, but is not limited to it. For example, the E-AS 136 may be embodied as a part of the location retrieval unit 140.

The location retrieval unit 140 is a functional entity or a set of entities which acquire the location information by retrieving the location of the UE 110 in response to a location service request. The location retrieval unit 140 may be an independent functional entity or may include a different kind of location server function (LSF) 410 acquiring the location information or the E-AS performing a routing determination function of providing the routing information on a suitable emergency center and a gateway mobile location center (GMLC) 430 retrieving the location of the UE. In this embodiment, the E-AS is not included in the location retrieval unit, but is a part of the IMS core. Accordingly, the function of the E-AS may be included in the E-CSCF.

Hereinafter, this embodiment will be described in detail.

Referring to FIG. 4, when an emergency location service is performed using the IMS core, the location information of the UE transmitted to the emergency center (PSAP/EC) can be classified into initial location information, mid-call location information, and updated location information.

The procedure of providing an emergency location service using the interoperation between the IMS core and the PS network can be roughly divided into three procedures. A procedure (S401 to S404) of attaching the UE to the PS network in the first procedure and a location updating procedure (S601 to S607) of updating the location information of the UE in response to a request from the emergency center are similar to those shown in FIG. 2 and thus description thereof is omitted.

The emergency call establishing procedure as a second procedure of retrieving the location of the UE in response to a request from the IMS core and establishing an emergency call between the UE and the emergency center location retrieval procedure is substantially similar to the embodiment shown in FIG. 2 except the difference in the flowchart of messages that an entity receiving the SIP INVITE message from the UE and transmitting a location retrieval request to the location retrieval unit is not the E-CSCF but the E-AS.

The emergency call establishing procedure of retrieving the location of the UE in response to a request from the IMS core and establishing an emergency call between the UE and the emergency center is described below and the difference from the embodiment shown in FIG. 2 is mainly described.

The emergency call establishing procedure is started by transmitting a message (SIP INVITE) requesting for the start of an emergency call from the UE to the P-CSCF (S501). The P-CSCF having received the SIP INVITE message forwards the message to the E-CSCF (S502) and the E-CSCF transmits the SIP INVITE message to the E-AS (S503).

The emergency call initiating request message (SIP INVITE) includes the ID of the user equipment (UE ID). The emergency call initiating request message can further include an IP address of the UE, initial location information, capability of the user equipment (UE Capa), a location identifier (lid) of the network to which the user equipment currently is attached, emergency indicator information, and initial session description protocol offer (initial SDP offer).

Next, the E-CSCF having received the emergency call initiating request message determines a location retrieval unit on the basis of the initial location information (for example, a serving cell ID of the UE or an IP address of the UE) received from the UE and transmits an LCS request message requesting for retrieving the location of the UE to the location retrieval unit (S504). When the location retrieval unit is known in advance, the LCS request message requesting for retrieving the location of the UE can be transmitted to the location retrieval unit.

The LCS request message may be a message using an SIP or a message using another protocol. For example, when the location retrieval unit supports the IMS signal, the SIP INVITE message can be transmitted with the LCS message without any conversion. However, when the location retrieval unit does not support the IMS signal or when it is required that the IMS signal and the LCS signal must be distinguished for communication, the E-CSCF may convert the SIP INVITE message into another compatible message and transmit the converted message.

Next, the location retrieval unit having received the LCS request message accesses the UL through the SGSN and the RAN to calculate the current location of the UL by using a predetermined location retrieval method (S505 to S509).

Specifically, the location retrieval unit transmits a PSL (Provide Subscriber Location) message requesting for reporting the location value of the UE to the SGSN (S505). The SGSN forwards the PSL message to the RAN with the LCS request message (S506). The RAN having received the PSL message and the UE calculate the current location of the UE with the RRLP/RRC message (S507). The SGSN forwards information including the calculated current location of the UE to the RAN with the LCS response message (S508) and the SGSN transmits the information including the current location of the UE to the location retrieval unit with the PSL response message (S509).

When the initial location information of the UE included in the SIP INVITE message transmitted from the UE to the E-AS is suitable for selecting an emergency center, the procedure of calculating the location between the location retrieval unit and the UE can be omitted.

Next, the location retrieval unit having acquired the current location of the UE transmits the LCS response message including the current location information of the UE to the E-AS in response to the LCS request message (S510).

Subsequently, when the E-AS receives the LCS response message including the current location information of the UE from the location retrieval unit, steps S511 to S522 of setting a channel between the UE and the emergency center corresponding to the received location information of the UE are performed.

First, the E-AS having received the LCS response message including the location information of the UE from the GMLC selects an emergency center on the basis of the location information of the UE (S511). In this case, the E-AS may extract an emergency center identifier from the received message. The E-AS may extract information for identifying the emergency center other than the emergency center identifier.

The information for identifying an emergency center may be ESRD (Emergency Service Routing Digits), ESRK (Emergency Service Routing Key), ESRN (Emergency Service Routing Number), or ESQK (Emergency Service Query Key).

The E-AS transmits the SIP INVITE message to the selected emergency center (PSAP/EC) (S512).

Here, it is described that the E-AS is an entity independent of the E-CSCF, but the function of the E-AS may be embodied in the E-CSCF. In this case, since the E-CSCF combines the function of the E-AS, step S503 is not necessary and steps S510 to S512 involved by the E-AS are involved by the E-CSCF.

Then, the emergency center having received the SIP INVITE message from the E-AS opens a channel for an emergency call with the UE in accordance with a general call request procedure (S513 to S522). The channel may be a real-time transport protocol (RTP) channel. The specific steps of opening the channel is not limited and as described later, the procedure may be performed by exchanging predetermined messages between the emergency center and the NE using the IMS core as the intermediate medium. The steps are substantially similar to steps S215 to S222 shown in FIG. 2, except that the call message transmitted from the emergency center and the acknowledgement message in response to the SIP INVITE message pass through the E-AS, and thus specific description thereof will be omitted.

In this way, when the call message and the acknowledgement message are exchanged between the UE and the emergency center, a channel is opened between the UE and the emergency center and an emergency call is performed through the channel (S522). The emergency call can be performed using a multimedia session included in both the initial SDP offer message and the SDP offer 2 message, that is, a multimedia session which can be supported by both the UE and the emergency center.

Figure 5:
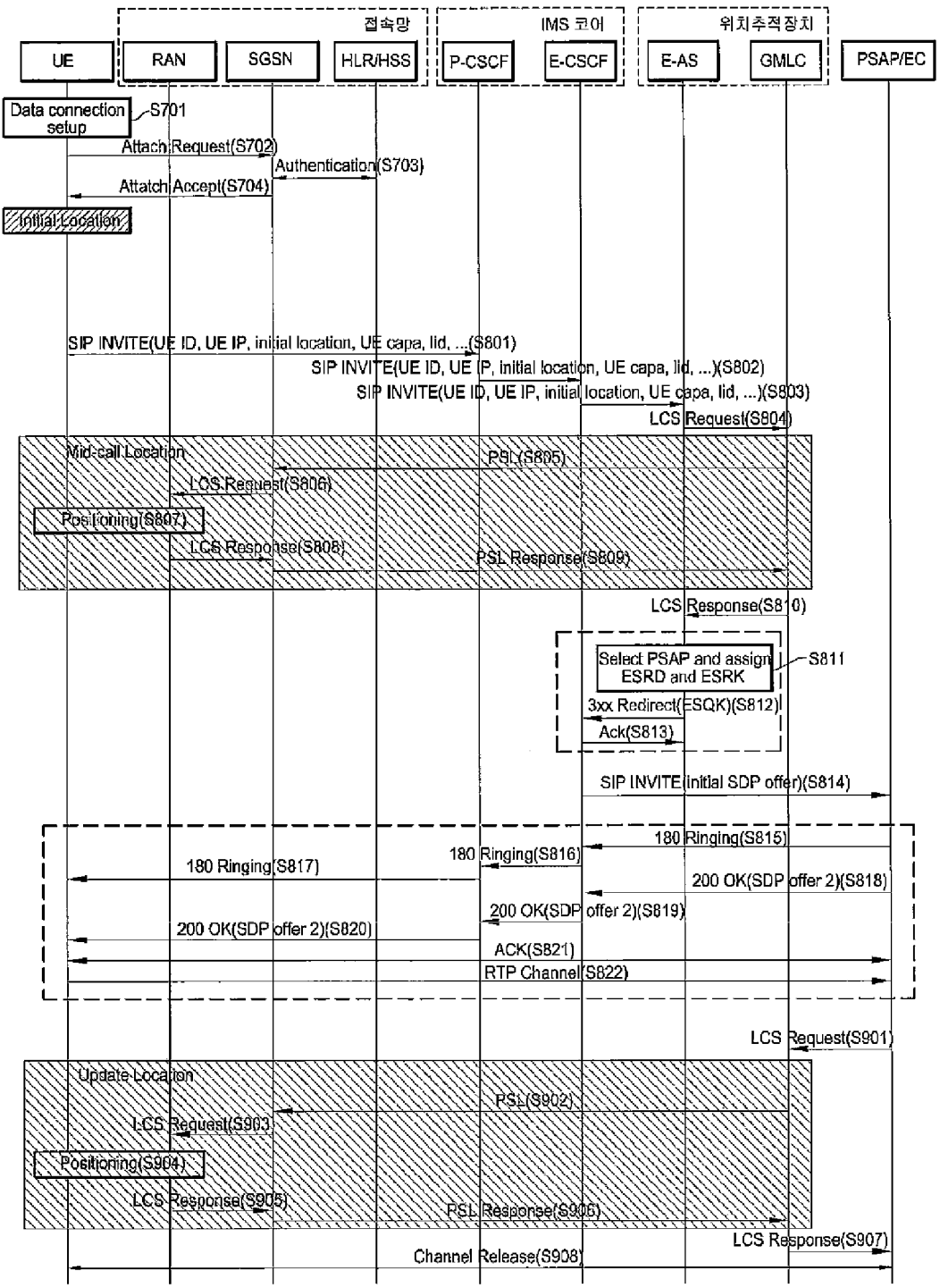
FIG. 5 is a flowchart illustrating a method for providing an emergency location service according to still another embodiment of the invention.

FIG. 5 is flowchart illustrating a method for providing an emergency location service according to another embodiment of the invention.

This embodiment is similar to the embodiment shown in FIG. 3, except that the E-AS providing the routing information on the emergency center so as to forward an emergency call to a suitable emergency center through the IMS is embodied as a part of the location retrieval unit.

The location retrieval unit according to this embodiment is a functional entity or a set of entities which acquire the location information by retrieving the location of the UE 100 in response to a location service request. The location retrieval unit may include the E-AS performing a routing determination function of providing the routing information on a suitable emergency center and a gateway mobile location center (GMLC) retrieving the location of the UE.

The location retrieval unit may be an independent functional entity or may include a different kind of location server function (LSF) serving to acquire the location information.

Referring to FIG. 5, when an emergency location service is performed using the IMS coir, the location information of the UE transmitted to the emergency center (PSAP/EC) can be classified into initial location information, mid-call location information, and updated location information.

The procedure of providing an emergency location service using the interoperation between the IMS core and the PS network can be roughly divided into through procedures. A procedure (S701 to S704) of attaching the UE to the PS network in the first procedure and a location updating procedure (S901 to S907) of updating the location information of the UE in response to a request from the emergency center are similar to the embodiment shown in FIG. 4 and thus description thereof is omitted.

Hereinafter, the emergency call establishing procedure as a second procedure of retrieving the location of the UE in response to a request from the IMS core and establishing an emergency call between the UE and the emergency center location retrieval procedure is described specifically.

The emergency call establishing procedure is started by transmitting a message (SIP INVITE) requesting for the start of an emergency call from the UE to the IMS core (S801 and S802). The start step can be divided into a step (S880) of transmitting the SIP INVITE message from the UE to the P-CSCF and a step (S802) of forwarding the SIP INVITE message from the P-CSCF having received the SIP INVITE message to the E-CSCF.

The SIP INVITE message includes the ID of the UE (UE ID) and may further include an IP address of the UE, initial location information, capability of the user equipment (UE Capa), a location identifier (lid) of the network to which the user equipment currently is attached, emergency indicator information, and initial session description protocol offer (initial SDP offer).

Next, the E-CS CF having received the emergency call initiating request message determines a location retrieval unit on the basis of the initial location information (for example, a serving cell ID of the UE or an IP address of the UE) received from the UE and transmits an LCS request message requesting for retrieving the location of the UE to the location retrieval unit (S803). The SIP INVITE message can be used as the LCS request message but the invention is not limited to it.

The E-AS of the location retrieval unit having received the SIP INVITE message transmits a location retrieval request to the GMLC of the location retrieval unit. The GMLC having received the LCS request message accesses the UE through the SGSN and the RAN to calculate the current location of the UE using a predetermined location retrieval method (S805 to S809). The steps are similar to steps S505 to S509 and thus specific description thereof will be omitted.

Next, the GMLC having acquired the current location of the UE through the SGSN and the RAN transmits the LCS response message including the current location information of the UE to the E-AS of the location retrieval unit so as to acquire the routing information on the emergency center.

The E-AS of the location retrieval unit having received the LCS response message selects an emergency center on the basis of the location information of the UE (S811). In this case, the E-AS may extract an emergency center identifier from the received message. The E-AS may extract information for identifying the emergency center, other than the emergency center identifier.

Next, the E-AS of the location retrieval unit transmits a transmission message including the information on the selected emergency center to the E-CSCF (S812). The transmission message may be an SIP 3xx redirection message, but is not limited to it. The transmission message may include the information for identifying an emergency center. The information for identifying an emergency center may be ESRD (Emergency Service Routing Digits), ESRK (Emergency Service Routing Key), ESRN (Emergency Service Routing Number), or ESQK (Emergency Service Query Key).

On the other hand, the E-AS may forward the ESRD, the ESRK, the ESRN, or the ESQK to the E-CSCF with the SIP INVITE message. In this case, since the E-AS is used like the SIP proxy server, a subsequent step (S813) of forwarding an acknowledgement message to the E-AS from the E-CSCF is not necessary.

Subsequently, the E-CSCF having received the message including the information on the emergency center or the like transmits the acknowledgement message to the E-AS (S813).

In this way, the location retrieval unit having received the location retrieval request from the E-CSCF retrieves the current location of the NE through steps S804 to S811 and acquires the routing information on the emergency center. The location retrieval unit transmits the message including the information on the emergency center to the E-CSCF of the IMS core through step S812.

Next, the E-CSCF transmits the SIP INVITE message to the emergency center (for example, PSAP) selected on the basis of the received information on an emergency center (S814). The SIP INVITE message can include an IP address of the UE (UE IP), initial location information, capability of the user equipment (UE Capa), a location identifier (lid) of the network to which the UE currently is attached, emergency indicator information, and initial session description protocol offer (initial SDP offer).

The emergency center having received the SIP INVITE message from the E-CSCF performs steps S815 to S822 of opening a channel for an emergency call with the UE in accordance with a general call request procedure. The channel may be a real-time transport protocol channel (RTP channel). The steps are substantially similar to the steps (S513 to S522) shown in FIG. 4, except that the call message transmitted from the emergency center and the acknowledgement message in response to the SIP INVITE message do not pass through the E-AS, and thus specific description thereof will be omitted.

In this way, when the call message and the acknowledgement message are exchanged between the UE and the emergency center, an RTP channel is opened between the UE and the emergency center and an IMS emergency call is performed through the RTP channel (S822). The IMS emergency call can be performed using a multimedia session included in both the initial SDP offer message and the SDP offer 2 message, that is, a multimedia session which can be supported by both the UE and the emergency center.

As described above, in the method for providing an emergency location service using the interoperation between the IMS core and the access network according to the invention, the E-AS of the IMS core establishes an emergency call between the UE and the emergency center using the interoperation between the IMS core and the location retrieval unit having a location retrieval function.

Although the invention has been described with reference to the exemplary embodiments, it will be understood by those skilled in the art that the invention can be modified and changed in various forms without departing from the technical spirit and scope of the invention. Therefore, the invention is not limited to the aforementioned embodiments, but will include all embodiments within the scope of the attached claims.

INDUSTRIAL APPLICABILITY

According to the present invention described above, an emergency call between a user equipment and an emergency center is established using interoperability between the IMS core and the location retrieval unit having a location retrieval function. Accordingly, it is possible to efficiently process the emergency call between the user equipment and the emergency center using the interoperability between the IMS core and the access network.

Since the E-CSCF or the E-AS of the IMS core serves as an intermediate medium for properly routing the IMS signal and the LCS signal (signals associated with the location service), two kinds of signals can be smoothly distinguished from each other and correlated to each other. Accordingly, it is possible to provide an emergency location service using the IMS regardless of characteristics or structures of the networks.

The invention claimed is:

1. A method for providing an emergency location service, the method comprising:

transmitting an emergency call initiating request message including information indicating an initial location of a user equipment (UE) from the UE to an emergency call session control function (E-CSCF) via a proxy call session control function (P-CSCF);

determining, by the E-CSCF having received the emergency call initiating request message, whether the information indicating the initial location of the UE included in the emergency call initiating request message, is sufficient for selecting an emergency center (EC);

transmitting the emergency call initiating request message from the E-CSCF to the EC which is selected by the E-CSCF when it is determined the information indicating the initial location of the UE included in the emergency call initiating request message, is sufficient for selecting the EC;

when it is determined that the initial location information is not sufficient for selecting the EC, acquiring a mid-call location of the UE by a location retrieval unit having received a location service request message from the E-CSCF, and transmitting the emergency call initiating request message from the E-CSCF to an EC which is selected by the E-CSCF on the basis of the mid-call location of the UE, wherein the location retrieval unit acquires the mid-call location of the UE by enabling a serving general packet radio service (GPRS) supporting node (SGSN) to request updated location information from a radio access network (RAN) which has a radio access to the UE; and establishing an emergency call between the EC having received the emergency call initiating request message and the UE in response to the emergency call initiating request message.

2. The method according to claim 1, wherein the emergency call initiating request message transmitted from the UE includes at least one of an ID of the UE, emergency indicator information, capability of the UE, and a location identifier of a network to which the UE is attached.

3. The method according to claim 2, wherein the ID of the UE is one of a SIP (Session Initiation Protocol) URI (Uniform Resource Identifier), a TEL (telephone) URI, and an emergency service ID.

4. The method according to claim 2, wherein the location identifier of the network to which the user equipment is attached is one of identification information of the cell in which the user equipment is located and identification information of the access network.

* * * * *